Oct. 24, 1950          J. R. LONG          2,527,485

REVOLVING STALL FOR VEHICLES

Filed June 14, 1948          4 Sheets-Sheet 1

INVENTOR.
John R. Long
BY
Attorneys

Oct. 24, 1950　　　　　J. R. LONG　　　　　2,527,485
REVOLVING STALL FOR VEHICLES

Filed June 14, 1948　　　　　　　　　　4 Sheets-Sheet 4

INVENTOR.
John R. Long
BY Ely & Frye
Attorneys

Patented Oct. 24, 1950

2,527,485

UNITED STATES PATENT OFFICE 2,527,485

REVOLVING STALL FOR VEHICLES

John R. Long, Akron, Ohio, assignor of one-third to Lyle C. King, Akron, Ohio

Application June 14, 1948, Serial No. 32,853

5 Claims. (Cl. 20—1.13)

This invention relates to a type of garage housing a revolving runway or turntable whereby a vehicle may be driven into or out of a garage without backing up, and as such represents certain improvements over my prior Patent No. 1,934,933 dated November 14, 1933. As set forth in the specification of the said patent, the turntable is rigid in all positions with respect to a vertical axis and access to the ramp is provided in a permanent inclined landing in front of and spaced from the front of the garage. Such an adjunct is unsightly and somewhat of a hazard. It is therefore one of the principal objects of the invention to provide a turntable carrying its own landing ramp so that the need for a permanent outer landing may be eliminated. More particularly, it is an object to provide a turntable constructed for slight tilting motion in a single direction to drop a landing ramp for the passage of a vehicle. A still further object is to provide a resiliently mounted apron, other objects being to eliminate complicated central bearing structures and provide for easy turning of the cradle.

To these and other ends which will in part be apparent and in part made manifest as the description proceeds, the invention comprises certain embodiments, a preferred form of which is illustrated in the accompanying drawings in which:

Fig. 5 is a sectional view taken on the line 5—5 of Fig. 1; and

Figure 1:
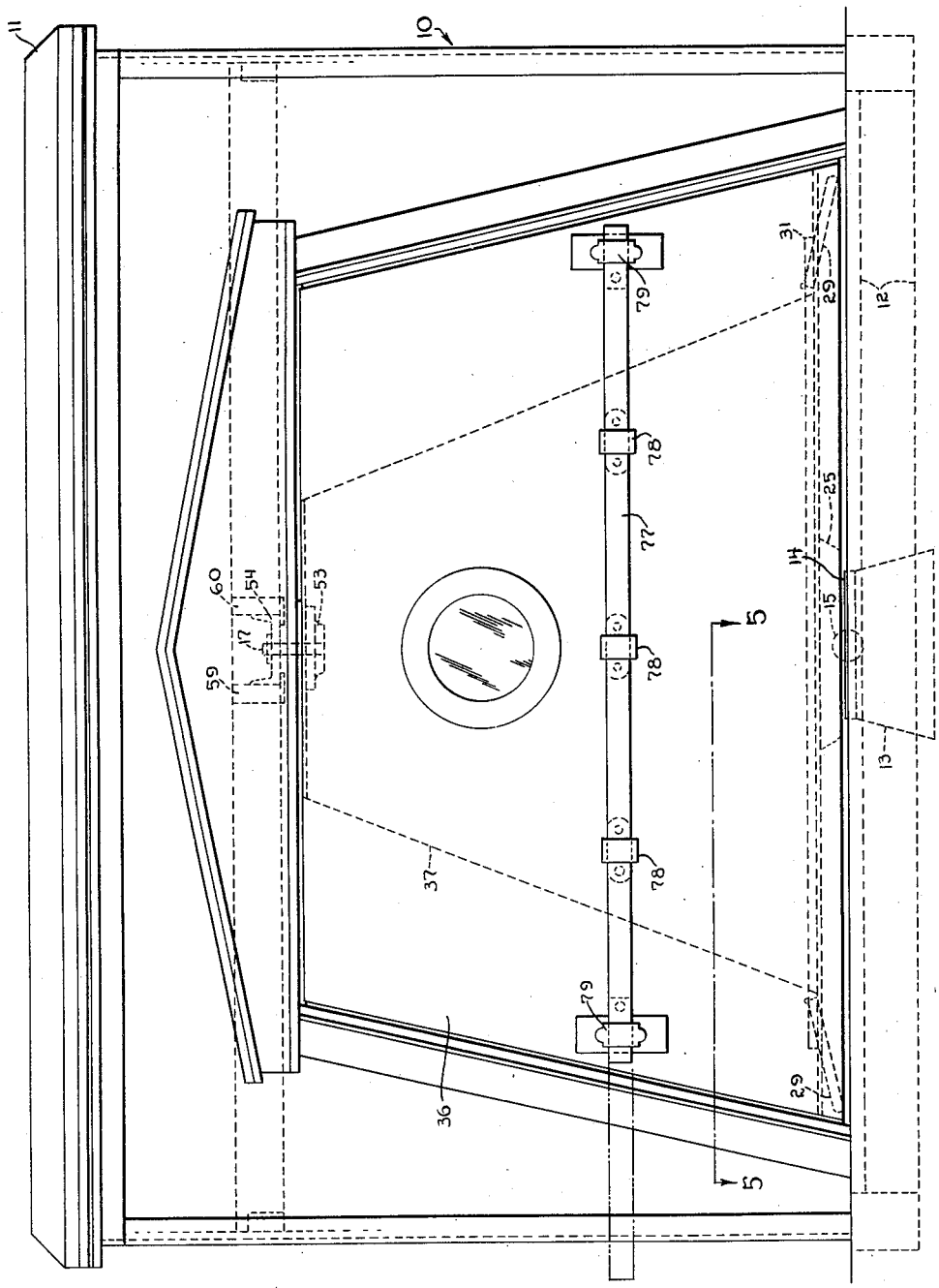
Fig. 1 is a front elevation of a garage with the turntable swung to housed position.

Referring to the drawings by characters of reference, there is shown generally at 10 a garage building having a roof 11 and any convenient floor structure, such as shown generally at 12, preferably of cement. Centrally of the floor space there is provided a pier 13 of concrete or other masonry which is embedded in the earth and accommodated through an opening in the flooring. A heavy metal plate 14, which may be of cast steel, rests upon the pier 13 and carries, in a hemispherical socket in its top, a spherical pivot or trunnion 15 which may be fast with the socket surface. In any event, the socket surface need not be machine-finished. The ball 15 forms the main support and turning pivot for the cradle, shown generally at 16, and together with the ball 15, the vertical axis of turning for the cradle is provided by a pintle 17 carried by the garage structure as will be later explained in greater detail.

The cradle structure

The floor of the cradle comprises two wooden runways 18, 19 supported from beneath at their ends by transverse, inverted channels 20, 21, and intermediate like channels 22, 23. The central line of the runways is reenforced by planks 18', 19' bolted to the underside thereof. The load on the transverse channels is carried to the central pivot 15 through a wider channel member 24 located between the runways and running the full length of the cradle, the transverse channels being riveted thereto as apparent from Fig. 3, or, preferably, welded. The channel 24 and a similar but shorter channel 25 inverted and riveted to its under side, have aligned, through openings accommodating a reduced neck 26 of a bearing plate 27 having a frustospherical cavity finished to provide a bearing surface for the ball 15.

Hinged, as at 28, at both ends of each runway are identical ramps 29 with their inner ends overlapping the end channels 20, 21. These ramps are engageable in pairs by channels 30, the latter being anchored at their ends to projections 31 of the runways 18, 19 by means of bolts 32 which normally retain the ramps in raised position by pressure of springs 33 adjustable through wing nuts 34. It will be seen that as the wheels of a vehicle engage the ramp, the pressure of the springs will be overcome, and the ramp will be lowered, but will return to raised position on departure of the wheel from the ramp in either direction. The outer ends of the ramps may be provided with metal reenforcing members 35, preferably in the form of inserts, to take up landing shocks and prevent cracking and splintering of the ramps.

Figure 4:
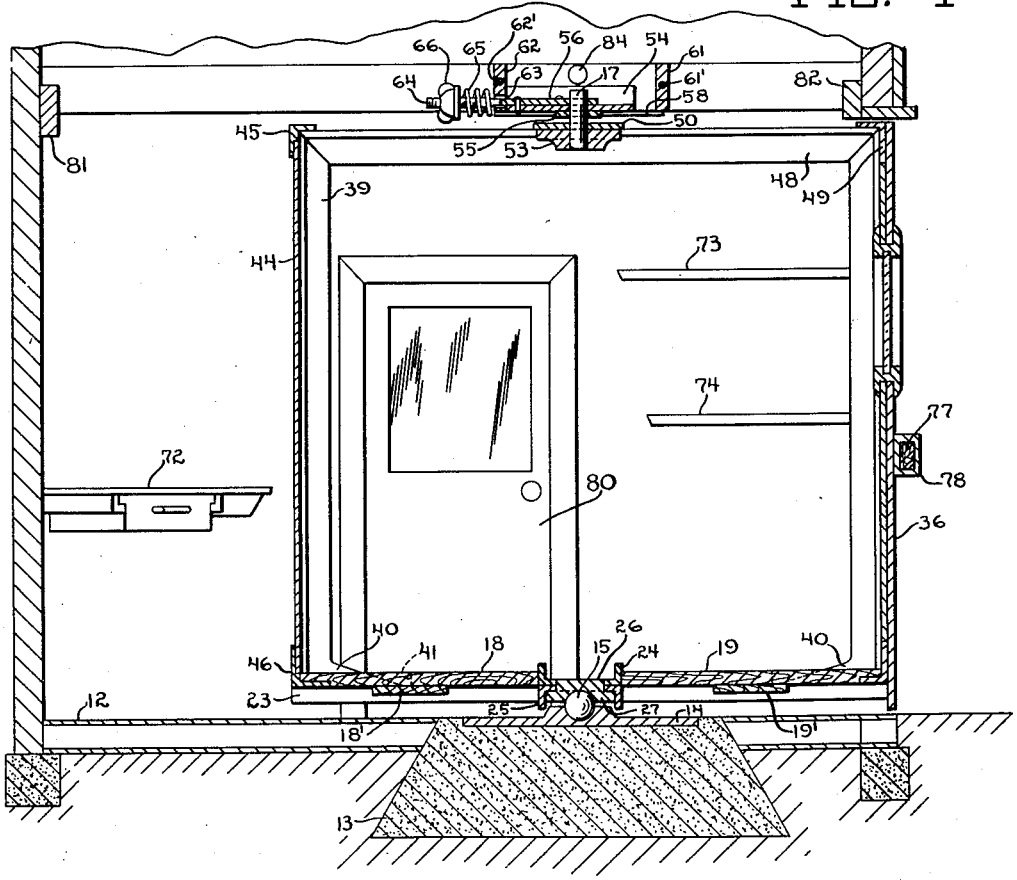
Fig. 4 is a sectional view taken on the line 4—4 of Fig. 2.
Figure 6:
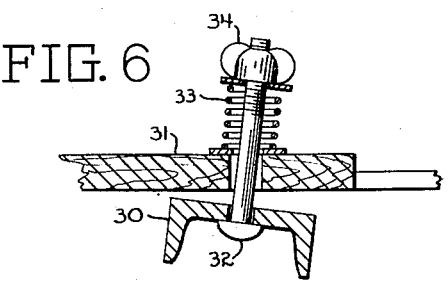
Fig. 6 is a sectional view of a detail taken on the line 6—6 of Fig. 2.

The superstructure of the cradle will now be described. As apparent from Fig. 1, that side 37 of the turntable is smaller in area than the opposite side 36 which constitutes the garage door. This results in clearances at one end of the garage during the half revolution of the cradle which leaves room for such useful items as shelves and cupboards. The trusswork defining these two sides 36, 37 is described as follows: On the smaller side, vertical struts 38, 39, of T-section, are attached to and carried by the ends of transverse channels 22, 23, the struts being footed as at 40 (Fig. 4) and engaging and attached to the cross channels over a considerable area through openings 41 in the runway 18. Slanting channel truss members 42, 43 have their lower ends dwelling upon and attached to the cross channels 20, 21, respectively, and their upper ends meeting and attached to the upper ends of struts 38, 39, respectively. Siding 44 of sheet metal, a top rail 45 of angle section and a bottom rail 46 of angle section complete the structure for this side. The larger side of the cradle, constituting the garage door, is similarly constructed except that the top rail 49 is longer and the two sides are joined by a pair of T section beams 47, 48 joining, respectively, the struts 38, 39 with their counterparts. A cross plate 50 is riveted to central portions of the beams 47, 48 and diagonal braces 51, 52 connect the ends of the plate 50 with the ends of the top rail 49.

Figure 3:
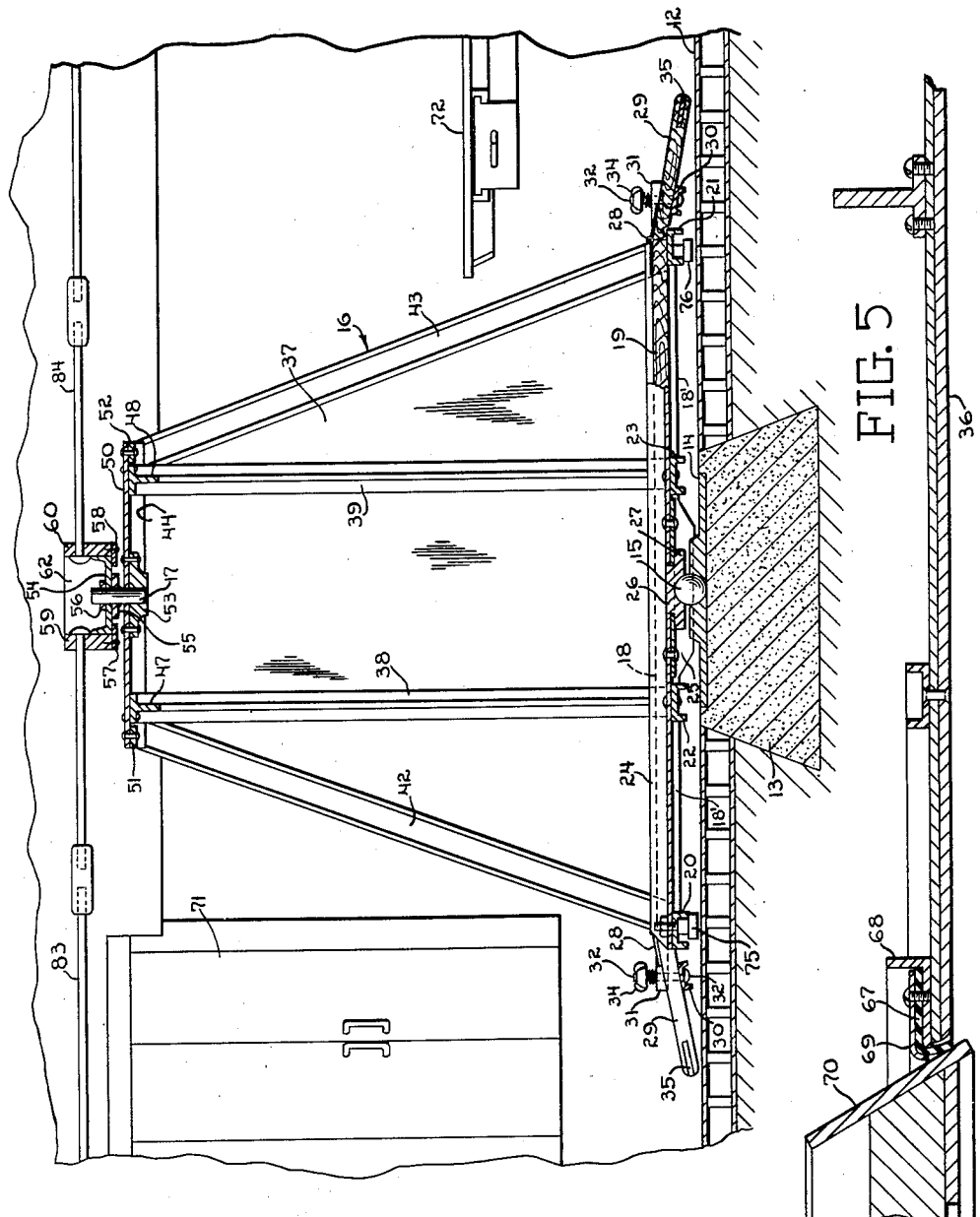
Fig. 3 is a sectional view taken on the line 3—3 of Fig. 2.

The prime function of the cross plate 50 is to carry the pintle or top trunnion 17. As best seen in Fig. 3, a flange 53 riveted to the underside of the plate 50 provides a bearing for the pintle 17. The latter is secured in an opening in a channel-section sleigh 54 by means of a flange 55 integral with the pintle and fixed to the lower part of the sleigh. The upper part of the pintle is loosely fitted into an opening of an arm 56 which is attached to the upper part of the sleigh, as by riveting. The sleigh is slidable along rails 57, 58 fixed respectively to the underside of a pair of joists 59, 60 carried by sills 81, 82. A pair of tie rods 83, 84, each equipped with a turnbuckle, are attached to the respective joists and serve to steady the same and reduce vibrations, and also provide fine adjustment for attaining verticality of the trunnion axis.

The limits of travel of the sleigh along the rails are defined by abutments 61, 62 athwart the beams received in mortise cuts therein and attached thereto as by bolts 61', 62'. An opening 63 in the rear abutment 62 accommodates a threaded extension 64 of arm 56 and a surrounding spring 65 held in compression by an adjustable wing nut 66 biases arm 56 toward the rear abutment and normally holds the sleigh against the same. In this position the axis of the pintle is vertically aligned with the center of ball trunnion 15. It will be noted that the construction of the sleigh and cradle provide for angular motion of the axis of the pintle about the center of the ball 15 in a single plane only and in a single direction away from the line of strict verticality. Thus, when the turn-table is swung outwardly, the longitudinal line of the runways can be tilted about the ball 15. In any other position of the turntable, it is not ordinarily possible to develop sufficient torque to accomplish such tilting.

As shown in Fig. 5, the door is of double-construction siding and carries on its slant edges sealing strips 67 of rubber-like material held in place against an angle-section strip 68 as by a screw-fastened holding strip 69. The side sills 70 of the door-way are slanted in two directions in order to accommodate the swing of the door panel. In this sense, the sills roughly approximate, at least in a small portion, an inner surface of a cone.

Figure 2:
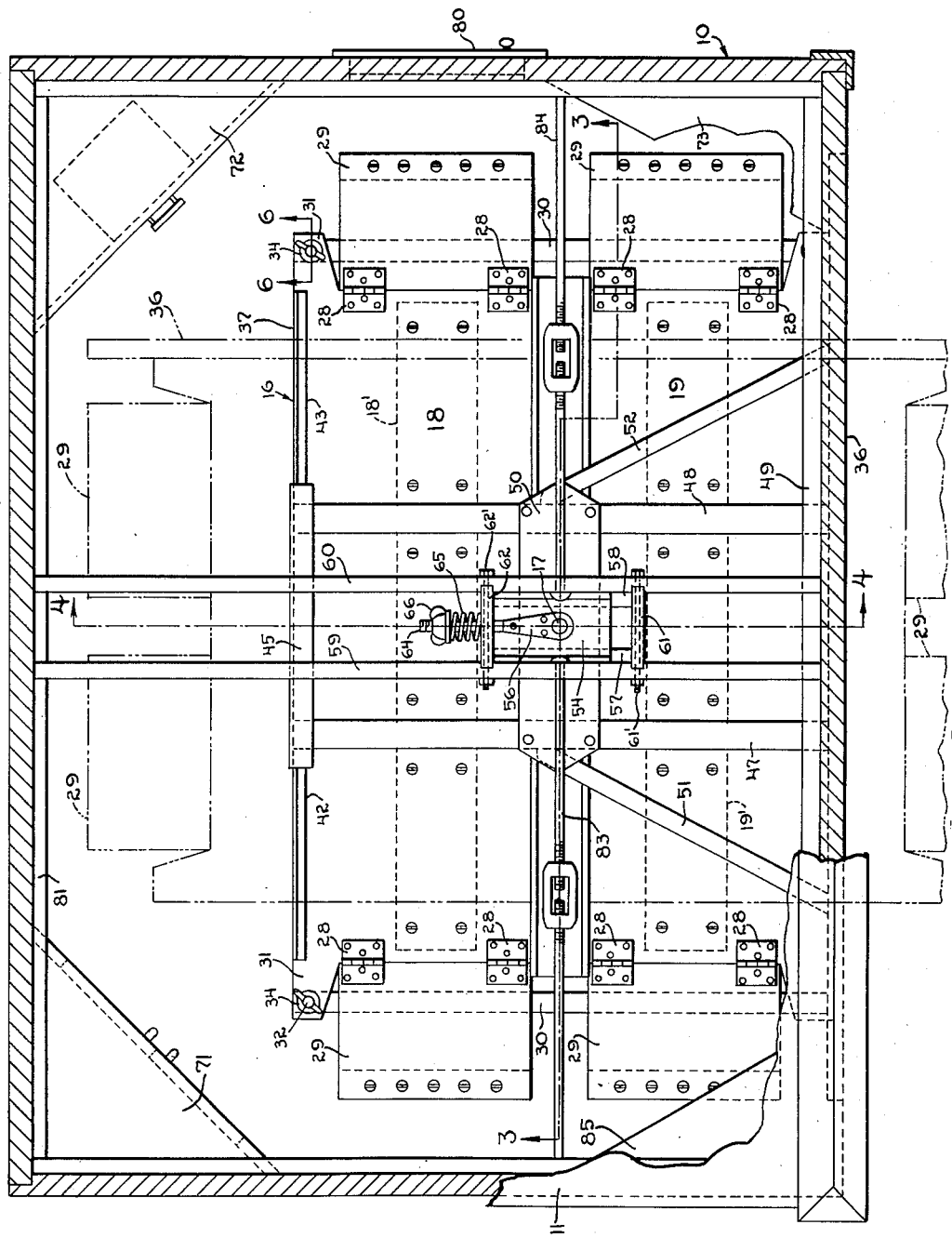
Fig. 2 is a top plan view of Fig. 1 with most of the roof structure cut away to show interior details of the garage and turntable.

The available space in the garage, for purposes other than car storage, is considerable, due both to the fact that the car is turned sidewise when in place and to the fact that the side having no door is minimized in overall area. The available room is clearly indicated in the drawings and Fig. 2 in particular, where 71 indicates a corner cupboard, 72 a corner shelf with drawer and 73, 74, 85 further corner shelves. Between cupboard 71 and shelf 72 is ample working floor space when the vehicle is stored. An auxiliary door 80 affords entrance to the garage independently of the turntable.

The operation of the turntable is extremely simple. Being nicely balanced on its trunnions and presenting relatively slight torque on the upper trunnion, the structure will remain in upright position and will, especially when unloaded, respond to a comparatively light force to commence rotation. Assuming that the table has been turned to present the ramps 29 in front of the doorway as indicated in dotted lines in Fig. 2, the trunnion 17 will still be vertically aligned with ball 15 and the ends of the ramps 29 will be clear of the ground but closely adjacent thereto. As the front wheels of an entering vehicle contact the ramp edges, the latter are urged downwardly to ground contact, further compressing springs 33. After contact of the ramp edges with the ground, further progress of the vehicle wheels acts upon the ramp with leverage of increasing advantage about the outer ramp edge as a fulcrum and transmits a gradually increasing load to the runways 18, 19 through the channel 20 or 21, the load on the hinges being thus minimized. The runways therefore tilt to provide a smooth incline for progress of the vehicle. This tilting of the runways may be limited to any desirable angle by means of adjustable foot members 75, 76. As the car rolls to a position affording a load distribution roughly near the balance point for the trunnion system, the upper trunnion will return to its normal, vertical alignment with the lower trunnion 15. In practice the equilibrium position is not a matter of careful location of the vehicle, but the latter may be located on the table in an area having comparatively wide limits without misalignment of the pintle 17.

In anticipation of a case where the turntable cannot be turned with the desired ease, I provide a lever in the form of a bar 77 carried by and slidable in a series of brackets 78, 79 providing a clearance of the bar from the surface of the door. When slid in either direction through the brackets, the bar provides a lever capable of overcoming any resistance which might be expected.

Obviously, as shown in my aforementioned patent, power means may be provided for operating the turntable.

While a spherical bearing has been shown at 15 and constitutes a simplified device for the purposes intended, obviously the full universal movement is not strictly necessary, and other forms of trunnion may be employed in place thereof, which will permit the tilting of the platform at least in the plane of swing of the upper trunnion.

While certain preferred embodiments of the various features of the invention have been shown, obviously it is not limited to any specific details and departures may be made without departing from the spirit and scope of the invention as defined in the appended claims.

What is claimed is:

1. In combination, a housing including a floor, a vehicle stall journaled above to the housing and below to the floor for revolution about a vertical axis, means providing for a slight degree of tilting of the common axis of said journals away from the vertical, a hinged ramp on one end of the stall, and resilient means normally holding said ramp in a raised position.

2. In combination, a housing including a floor, a vehicle stall journaled above to the housing and below to the floor for revolution about a vertical axis, means providing for a slight degree of tilting of the common axis of said journals away from the vertical, a ramp on one end of the stall and hinged thereto so as to overlap the stall, and resilient means normally holding the ramp in elevated position.

3. In combination, a housing including a floor, a vehicle stall journaled to the floor by a lower, universal joint and to the housing by an upper trunnion for normal rotation about a vertical axis, the upper trunnion being constructed and arranged to permit tilting of the stall away from the vertical about the universal joint, and resilient means normally holding the upper trunnion in vertical alignment against such tilting.

4. In combination, a housing including a floor, a vehicle stall trunnioned above to the housing and below to the floor for normal rotation about a vertical axis, means providing for tilting of said stall in one position of rotation thereof, a ramp hinged to said stall, resilient means normally holding said ramp in elevated position, and adjustable, ground-engaging means carried by said stall.

5. In combination, a housing including a floor, a vehicle stall trunnioned in the housing for rotation about a vertical axis by a spherical pivot carried by the floor, and by an upper pintle normally vertically aligned with the center of the spherical pivot, a sleigh carried by the pintle and a track carried by the housing, accommodating the sleigh and providing tilting action of the trunnion axis from the vertical in a predetermined plane.

JOHN R. LONG.

REFERENCES CITED

The following references are of record in the file of this patent:

UNITED STATES PATENTS

| Number | Name | Date |
| --- | --- | --- |
| 1,934,933 | Long | Nov. 14, 1933 |
| 2,135,765 | Paine | Nov. 8, 1938 |

FOREIGN PATENTS

| Number | Country | Date |
| --- | --- | --- |
| 11,069 | Great Britain | Aug. 13, 1887 |